US012749111B2

(12) United States Patent
Wadhera

(10) Patent No.: US 12,749,111 B2
(45) Date of Patent: Sep. 29, 2026

(54) DYNAMIC FORMAT ELECTRONIC CONFIRMATIONS

(71) Applicant: OneCore Global, Stamford, CT (US)

(72) Inventor: Vikas Wadhera, Stamford, CT (US)

(73) Assignee: OneCore Global, Stamford, CT (US)

( * ) Notice: Subject to any disclaimer, the term of this patent is extended or adjusted under 35 U.S.C. 154(b) by 0 days.

(21) Appl. No.: 18/545,377

(22) Filed: Dec. 19, 2023

(65) Prior Publication Data

US 2024/0242279 A1 Jul. 18, 2024

Related U.S. Application Data

(63) Continuation of application No. 17/242,516, filed on Apr. 28, 2021, now abandoned, which is a continuation of application No. 16/353,487, filed on Mar. 14, 2019, now abandoned.

(60) Provisional application No. 62/644,794, filed on Mar. 19, 2018.

(51) Int. Cl.

*G06Q 40/04* (2012.01)
*G06F 16/907* (2019.01)
*G06Q 20/40* (2012.01)

(52) U.S. Cl.

CPC ........... *G06Q 40/04* (2013.01); *G06F 16/907* (2019.01); *G06Q 20/405* (2013.01)

(58) Field of Classification Search

CPC ..... G06Q 40/04; G06Q 20/405; G06F 16/907
See application file for complete search history.

(56) References Cited

U.S. PATENT DOCUMENTS

| | | | | |
|---|---|---|---|---|
| 4,412,287 | A * | 10/1983 | Braddock, III | G06Q 40/04 705/37 |
| 4,903,201 | A | 2/1990 | Wagner | |
| 6,029,146 | A * | 2/2000 | Hawkins | G06Q 40/00 705/37 |
| 6,247,000 | B1 * | 6/2001 | Hawkins | G06Q 40/04 705/37 |
| 6,477,647 | B1 * | 11/2002 | Venkatraman | G06Q 30/06 713/168 |
| 7,318,045 | B2 | 1/2008 | Baecker et al. | |
| 7,433,842 | B2 | 10/2008 | Toffey | |
| 7,451,105 | B1 | 11/2008 | Doyle | |
| 7,716,117 | B2 | 5/2010 | Hawrysz | |
| 7,734,518 | B2 | 6/2010 | Toffey | |
| 8,321,327 | B1 | 11/2012 | Drennan et al. | |

(Continued)

FOREIGN PATENT DOCUMENTS

WO WO-2007134052 A2 * 11/2007 .......... G06Q 20/102

*Primary Examiner* — Mamon Obeid
*Assistant Examiner* — Pierre L Maccagno
(74) *Attorney, Agent, or Firm* — Fish & Richardson P.C.

(57) ABSTRACT

Methods, systems and processes can enable custom message formats in trading. One of the methods includes storing a plurality of different record formats. The method includes receiving a trade record, the trade record identifying a record format of the plurality of different message formats. The method includes identifying potential matching trade records to the trade record. The method includes comparing the trade record to at least one of the potential matches based on the message format. The method also includes generating a matching record based on determining that one of the potential matching trade records matches the message.

17 Claims, 7 Drawing Sheets

(56) References Cited

U.S. PATENT DOCUMENTS

| | | | | |
|---|---|---|---|---|
| 8,489,496 | B2 * | 7/2013 | Angle | G06Q 40/00 705/37 |
| 8,533,101 | B2 | 9/2013 | Cheung et al. | |
| 8,612,323 | B1 | 12/2013 | Frait et al. | |
| 9,727,916 | B1 | 8/2017 | Montesano et al. | |
| 9,916,623 | B2 | 3/2018 | Shontz | |
| 10,055,787 | B2 | 8/2018 | Woodmansey et al. | |
| 10,192,268 | B2 | 1/2019 | Booth | |
| 10,404,469 | B2 | 9/2019 | Madhavan et al. | |
| 10,453,131 | B2 | 10/2019 | Booth | |
| 2002/0023045 | A1 * | 2/2002 | Feilbogen | G06Q 40/04 705/37 |
| 2002/0128954 | A1 * | 9/2002 | Evans | G06Q 40/04 705/37 |
| 2003/0065623 | A1 * | 4/2003 | Corneil | G06Q 20/382 705/64 |
| 2003/0093362 | A1 * | 5/2003 | Tupper | H02J 3/008 705/37 |
| 2004/0039689 | A1 * | 2/2004 | Penney | G06Q 40/03 705/38 |
| 2004/0236668 | A1 * | 11/2004 | Toffey | G06Q 40/04 705/37 |
| 2006/0106708 | A1 * | 5/2006 | Abushaban | G06Q 40/04 705/37 |
| 2008/0183612 | A1 | 7/2008 | Frankel | |
| 2008/0262959 | A1 * | 10/2008 | Tupper | H02J 3/008 705/37 |
| 2009/0112775 | A1 | 4/2009 | Chiulli et al. | |
| 2011/0137785 | A1 * | 6/2011 | Lutnick | G06Q 40/04 705/37 |
| 2011/0137786 | A1 * | 6/2011 | Lutnick | G06Q 40/04 705/37 |
| 2011/0264577 | A1 | 10/2011 | Winbom et al. | |
| 2012/0005062 | A1 * | 1/2012 | Lutnick | G06Q 40/06 705/37 |
| 2012/0078772 | A1 | 3/2012 | Booth | |
| 2012/0221458 | A1 | 8/2012 | Booth | |
| 2014/0172663 | A1 | 6/2014 | Kronwall et al. | |
| 2015/0066732 | A1 | 3/2015 | Escott | |
| 2015/0081507 | A1 | 3/2015 | Sparrow et al. | |
| 2017/0039642 | A1 * | 2/2017 | Brookfield | G06Q 40/04 |
| 2019/0066216 | A1 | 2/2019 | Teixeria et al. | |
| 2019/0205980 | A1 * | 7/2019 | Pierce | G06Q 40/04 |
| 2019/0287173 | A1 * | 9/2019 | Wadhera | G06Q 20/405 |
| 2022/0012807 | A1 | 1/2022 | Wadhera | |

* cited by examiner

DYNAMIC FORMAT ELECTRONIC CONFIRMATIONS

CLAIM OF PRIORITY

This application is a continuation application to U.S. patent application No. U.S. patent application Ser. No. 17/242,516, filed on Apr. 28, 2021, which is a continuation application to U.S. patent application No. U.S. Ser. No. 16/353,487 filed on Mar. 14, 2019, which claims benefit to U.S. Provisional Patent Application Ser. No. 62/644,794, filed on Mar. 19, 2018, the entire contents of which are hereby incorporated by reference.

BACKGROUND

Equities trading relies on agreement between a buyer and a seller. A clearing house is a financial institution formed to facilitate the exchange (i.e., clearance) of payments, securities, or derivatives transactions. The clearing house stands between two clearing firms (also known as member firms or participants).

SUMMARY

In general, one innovative aspect of the subject matter described in this specification can be embodied in methods that include the act of storing a plurality of different record formats. The methods include the act of receiving a trade record, the trade record identifying a record format of the plurality of different message formats. The methods include the act of identifying potential matching trade records to the trade record. The methods include the act of comparing the trade record to at least one of the potential matches based on the message format. The methods also include the act of generating a matching record based on determining that one of the potential matching trade records matches the message.

Particular embodiments of the subject matter described in this specification can be implemented to realize one or more of the following advantages. Trades that were previously done manually may be automated. Computer systems may process records that were previously unprocessable.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may further include the act of storing at least one trade record in trade record data store. The record format may identify matching fields in the trade record, and comparing the trade record includes comparting matching fields in the trade record to at least some matching fields in the at least one of the potential matches. The methods may include the act of storing the trade record in a record datastore based on determining that none of the potential matching records matches the message. The operations may include the act of establishing a new record format between at least two users, the record format identifying fields. The message format may be determined by users of the system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
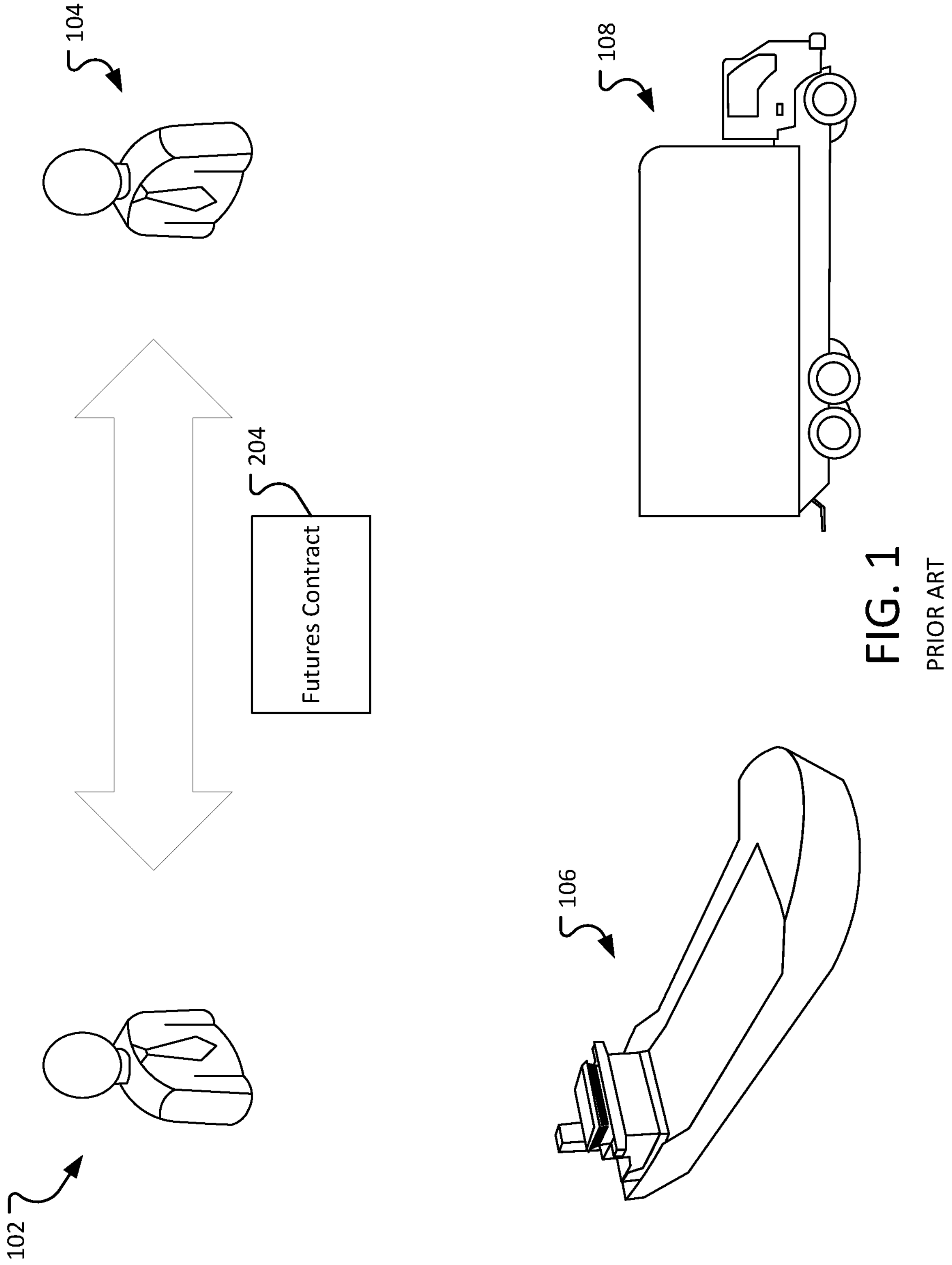
FIG. 1 PRIOR ART
FIG. 1 illustrates commodity trading.

Referring to FIG. 1, futures contracts and other derivatives are frequently traded without the expectation that the products or equities behind them will ever be delivered. For example, a futures contract is an agreement to buy or sell a particular commodity (such as oil 106 or pork bellies 108) or a financial instrument (such as a cash in a predetermined currency, stocks, etc.) at a predetermined price at a specified time in the future.

Frequently, the participants (trader 102 and 104) of a futures trade do not expect to hold the contract long enough to receive the commodity or financial instrument, instead, the futures contract may be used as an investment vehicle. However, at the time the futures contract is complete, delivery of the commodity will occur between the final holders of the contract. As such, physical delivery contacts have additional and differing requirements than some over the counter (OTC) instruments.

Figure 2:
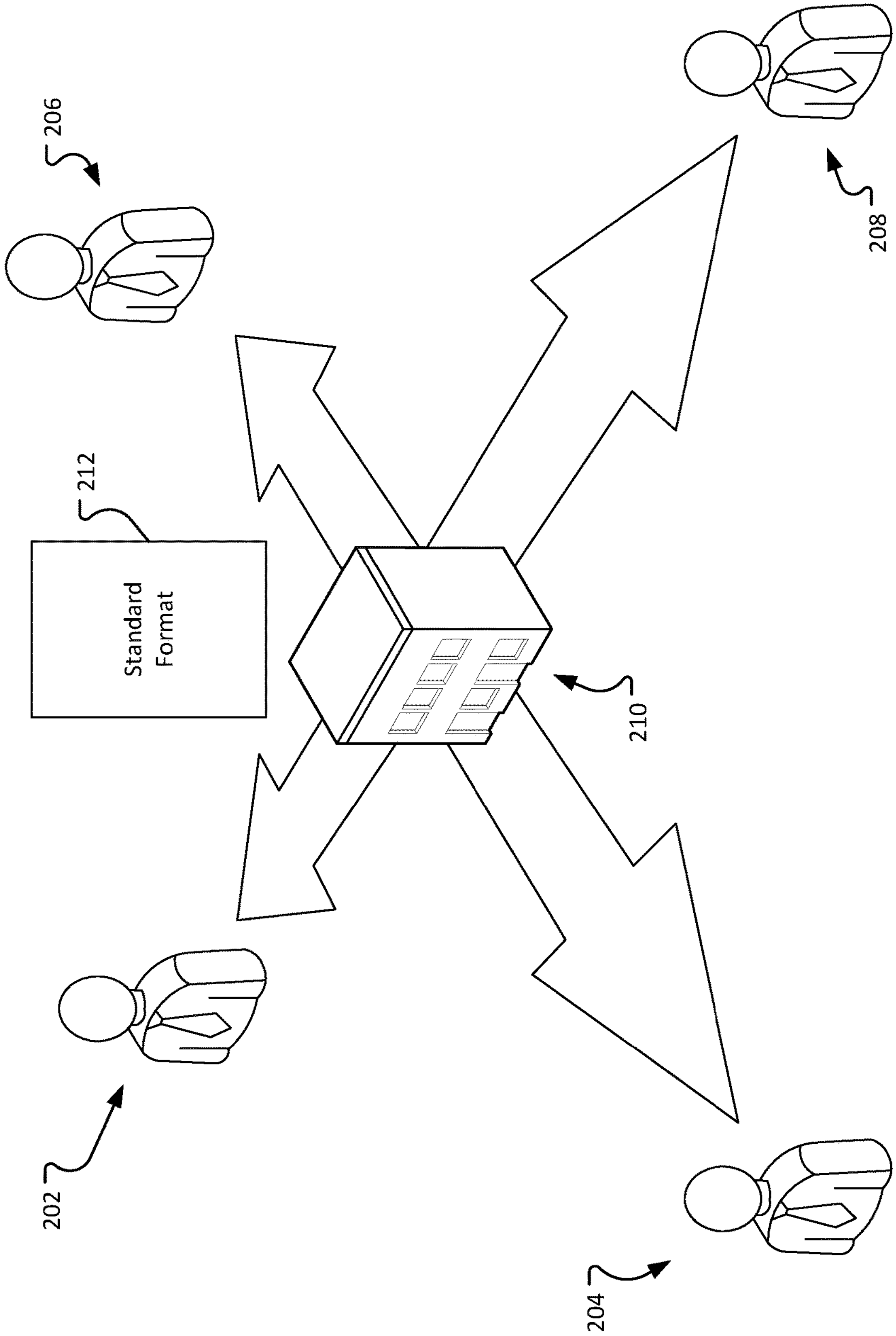
FIG. 2 PRIOR ART
FIG. 2 illustrates traders interacting with a conventional exchange confirmation platform.

A buyer and seller can arrange for trades of commodities and other equities using electronic communication. Currently only a small portion of physical instruments and OTC derivative instruments are electronically confirmed. FIG. 2 illustrates traders interacting with a conventional exchange confirmation platform 210. Generally, conventional electronic confirmation platforms 210 require that all traders (for example, trader 202, 204, 206, and 208) using a single standard format 212 for all messages send to the platform 210. The standard format 212, generally, is able to meet the needs of cleared and some derivative instruments; however, the single standard format 212 is unable to meet the needs when different trading partners have different requirements due to commodity, regional, and local jurisdictional requirements. The problem can be further complicated as some brokers may have additional data requirements due to the systems that they use.

Consequently, trades for these commodities and derivatives are manually confirmed. For example, a trader may send a fax, e-mail, or similar transmission to a trading partner. The trading partner reviews the document and manually confirms the details of the trade. In these scenarios, there is no integration between systems, consequently, the process of confirming trades is error prone and time consuming. There is a need in the marketplace for a mechanism whereby these trades may be electronically confirmed.

Figure 3:
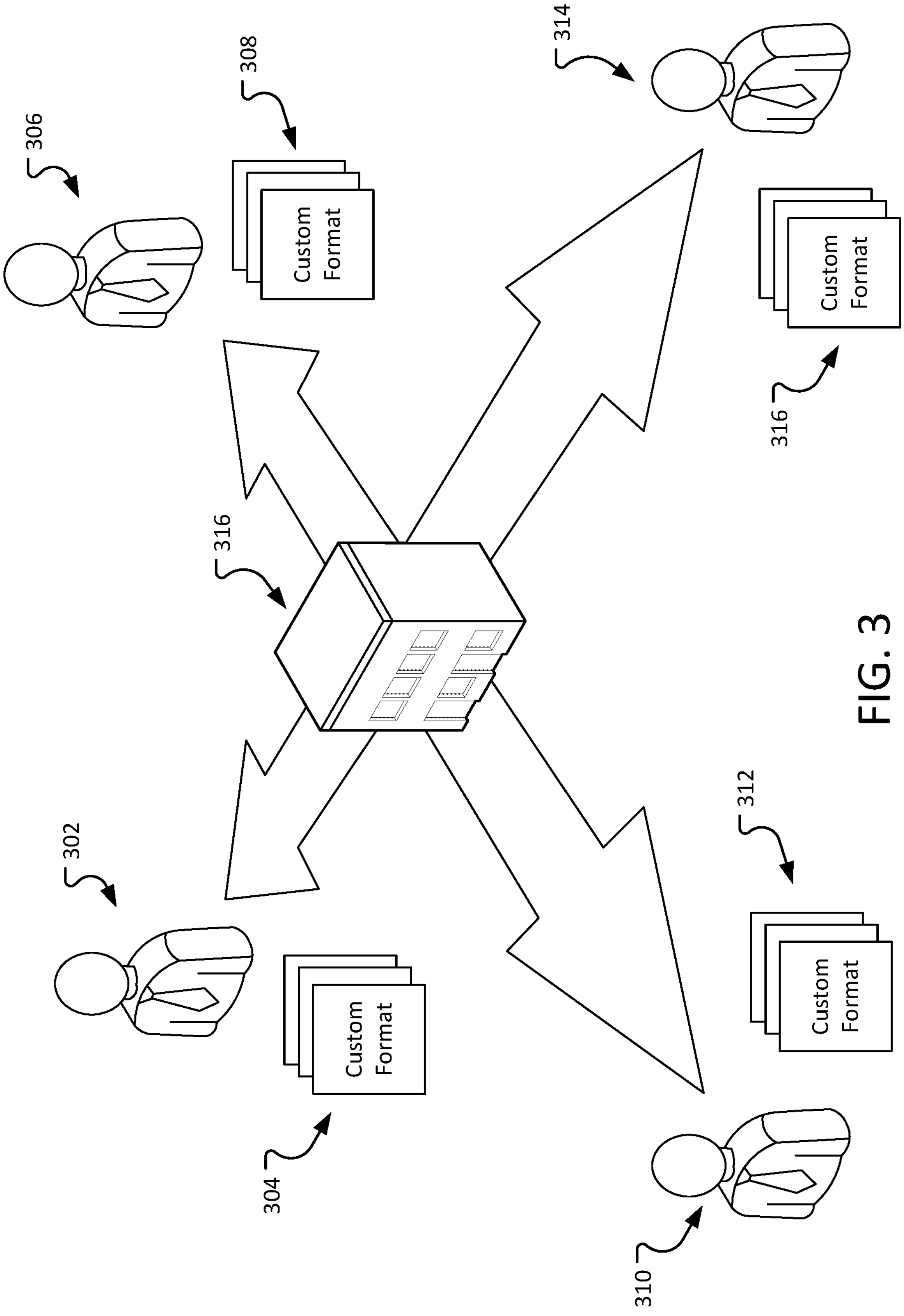
FIG. 3 illustrates an confirmation platform that enables traders to establish custom message formats to confirm trades that have special confirmation requirements.

FIG. 3 illustrates an confirmation platform 316 that enables traders to establish custom message formats to confirm trades that have special confirmation requirements. As used herein, a trader may refer to any entity capable of making trades (such as an individual or an organization). The confirmation platform 316 can accommodate trade confirmation between a buying trader and selling trader for different kinds of equities and derivatives. Traders are able to set up their own trade message formats for use with the trading platform. For example, trader 302 and trader 306 may agree to use one format for trading a particular commodity while trader 302 uses a different format for trading a different commodity with trader 310. In general, trade formats are agreed upon bilaterally between two traders.

In this example, trader 302 may use custom formats 304, trader 306 may use custom formats 308, trader 310 may use custom formats 312, and trader 314 may use custom formats 316. Generally, to have a trade confirmed between two traders, one trader (for example, trader 302) sends an electronic message to the confirmation platform 316 in a format agreed upon between the two traders. The second trader (for example, trader 306) also sends an electronic message to the confirmation platform 316 in the same format. The confirmation platform 316 reconciles the two messages, identifying them as two sides of the same trade. Once the confirmation platform 316 identifies that the two messages are part of the same trade, the confirmation platform 316 delivers a trade confirmation message to the first trader and the second trader.

Figure 4:
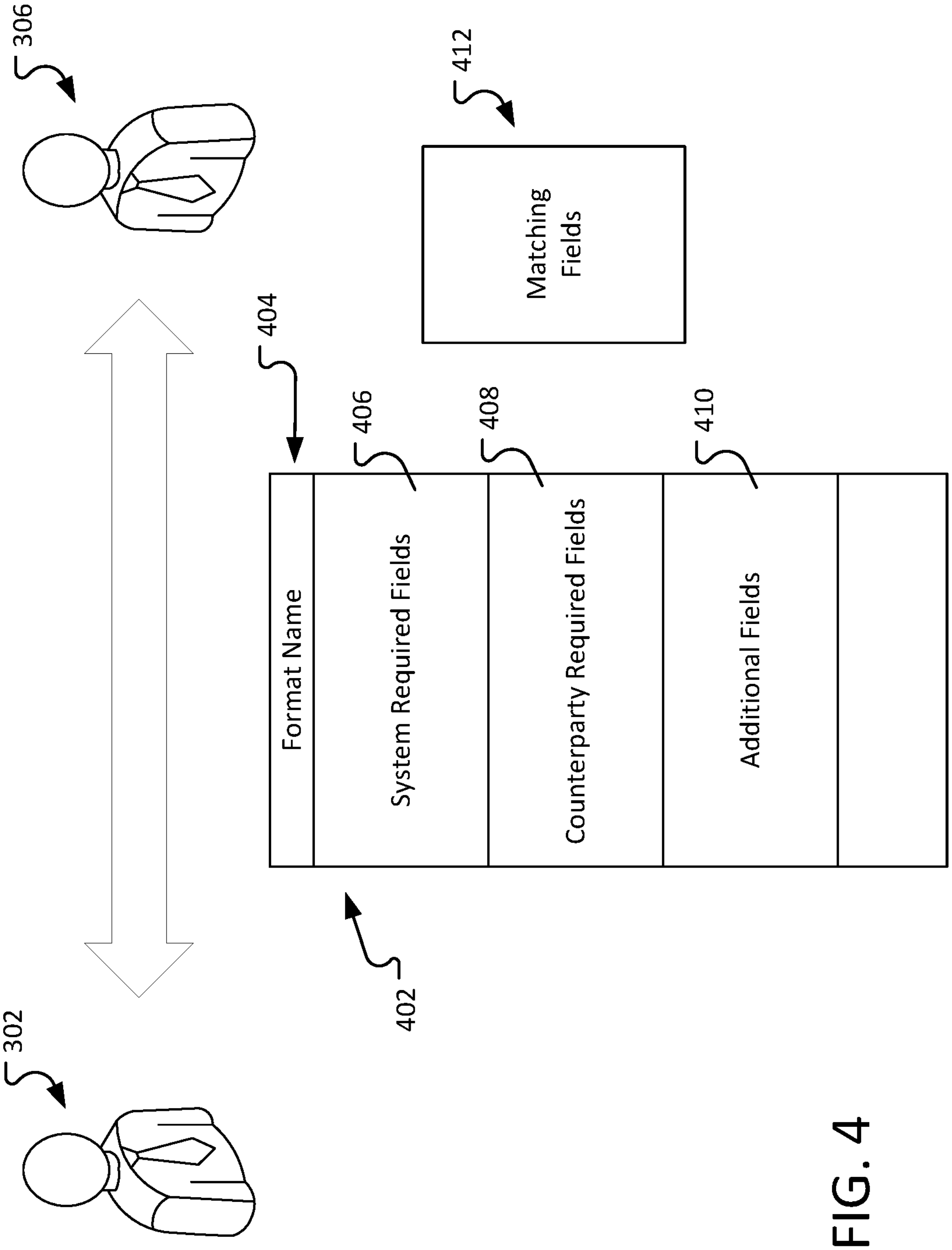
FIG. 4 illustrates an example of establishing a bilateral message format between two traders.

FIG. 4 illustrates an example of establishing a bilateral message format between two traders. In this example, trader 302 and trader 306 wish to establish a message format for use in confirming commodity trades. The traders agree on a message format 402. The message format 402 includes a format name 404. The format name 404 is used by an confirmation platform to identify the message format. Messages that are send to the confirmation platform can include the name of the message format which defines the structure of the message, as discussed further below.

In general, each message format includes a list of field names. The field names are used to identify a piece of data (a value) in a message that conforms to the message format. In a message that conforms to the message format, the field and the value are linked data items. The field, which is identified by a name, is a unique identifier within the message for the value. For example, a message format may include a field named "first name". Messages that conform to the message format will include a field "first name' and a corresponding value, for example, "Vikas." The message format itself, generally does not designate the value for the fields for a particular message that conforms to the format, but the message format may define the type of data that can be included in the field (for example, a number, a date, a currency amount, etc.). The message format may also include other validation rules associate with the field (for example, a number greater than zero).

The message format 402 can also include system required fields 406, the system required fields are fields which are required by the confirmation platform and constitute the minimum number of fields which need to be included in a message. sd The message format 402 can also include custom required fields 408. The custom required fields include fields that the traders agree must be included in a message conforming to the format. Examples of custom required fields may include delivery location, hazardous material designations, etc.

The message format 402 can also include optional fields 410. Optional fields are fields that the traders agree can be included in the message, but do not need to be included in the message. Examples of optional fields may include a comment field.

The message format 402 may also include an indication of matching fields 412. Matching fields are fields that are required to match in order for the confirmation platform to reconcile two messages. While the matching fields 412 are shown in FIG. 4 as a separate entity from the message format 402, in some implementations, the matching fields 412 may be integrated into the message format 402. For example, each field in the message format 402 may include an attribute that indicates whether or not the field is a matching field.

Figure 5:
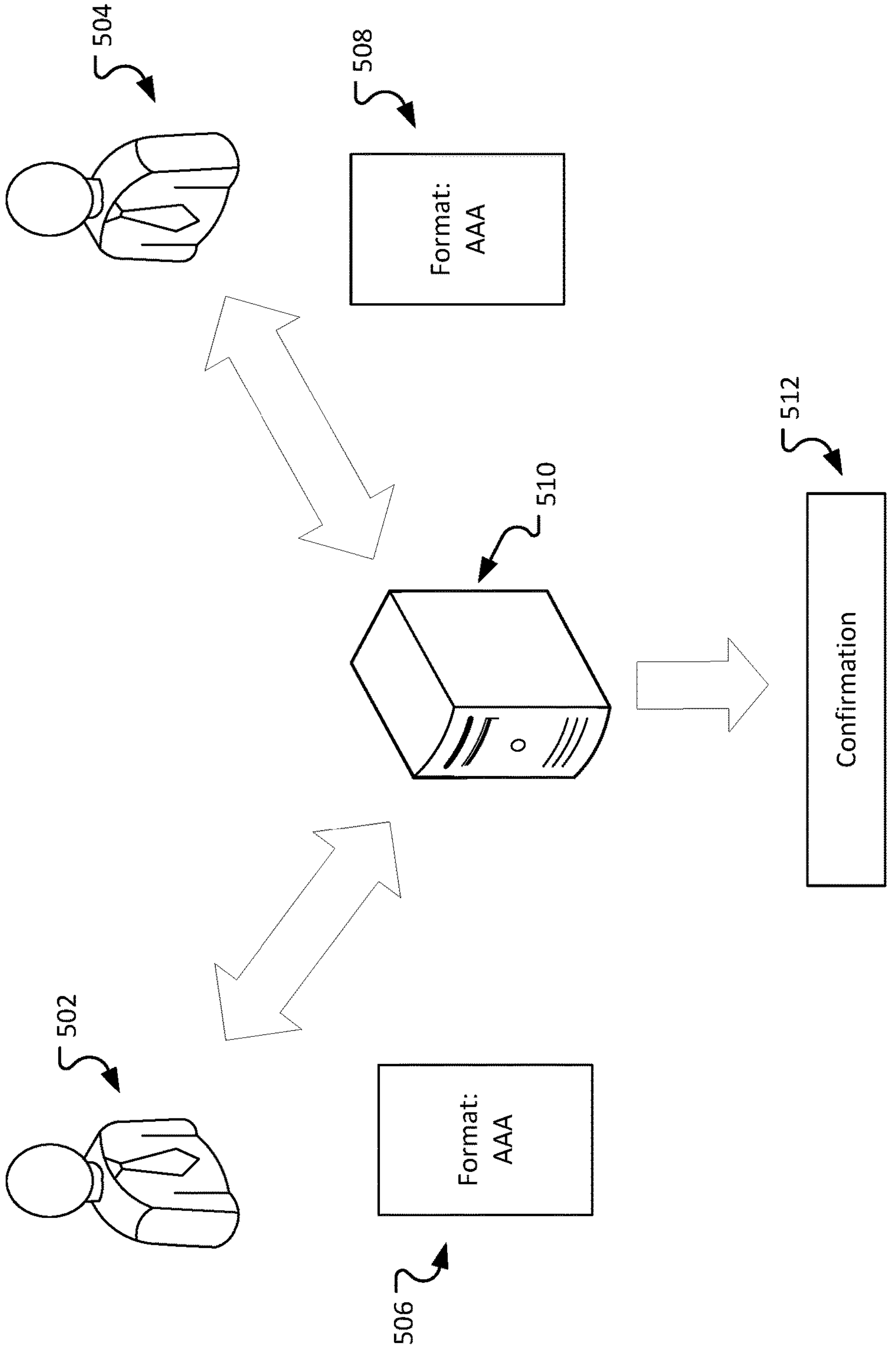
FIG. 5 illustrates an example of traders confirming a trade with an confirmation platform using custom message formats.

FIG. 5 illustrates an example of traders confirming a trade with an confirmation platform using custom message formats. In this example, trader 502 sends a trade record 506 (the message) to an confirmation platform 510. The trade record 506 includes a field that identifies the message format of the trade record (in this example, the message format is named "AAA"). The trade record may be, for example, an XML or JSON document.

Trader 504 also sends a trade record 508 to the confirmation platform 510. The trade record 508 also includes a field that identifies the message format (in this example, the message format of the trade record 508 is also "AAA").

The confirmation platform 510 identifies the message format. Using the message format (for example, stored in a data store on the confirmation platform), the confirmation platform identifies the fields in the messages that have been designated as matching fields. The confirmation platform 510 then compares the values of the fields that have been designated as matching fields in the trade record 506 to the values of the corresponding fields in the trade record 508.

If the identified values in the trade record 506 match the corresponding values in the trade record 508, then the confirmation platform may generate a trade confirmation record 512. The trade confirmation record may be sent to each of the traders.

Figure 6:
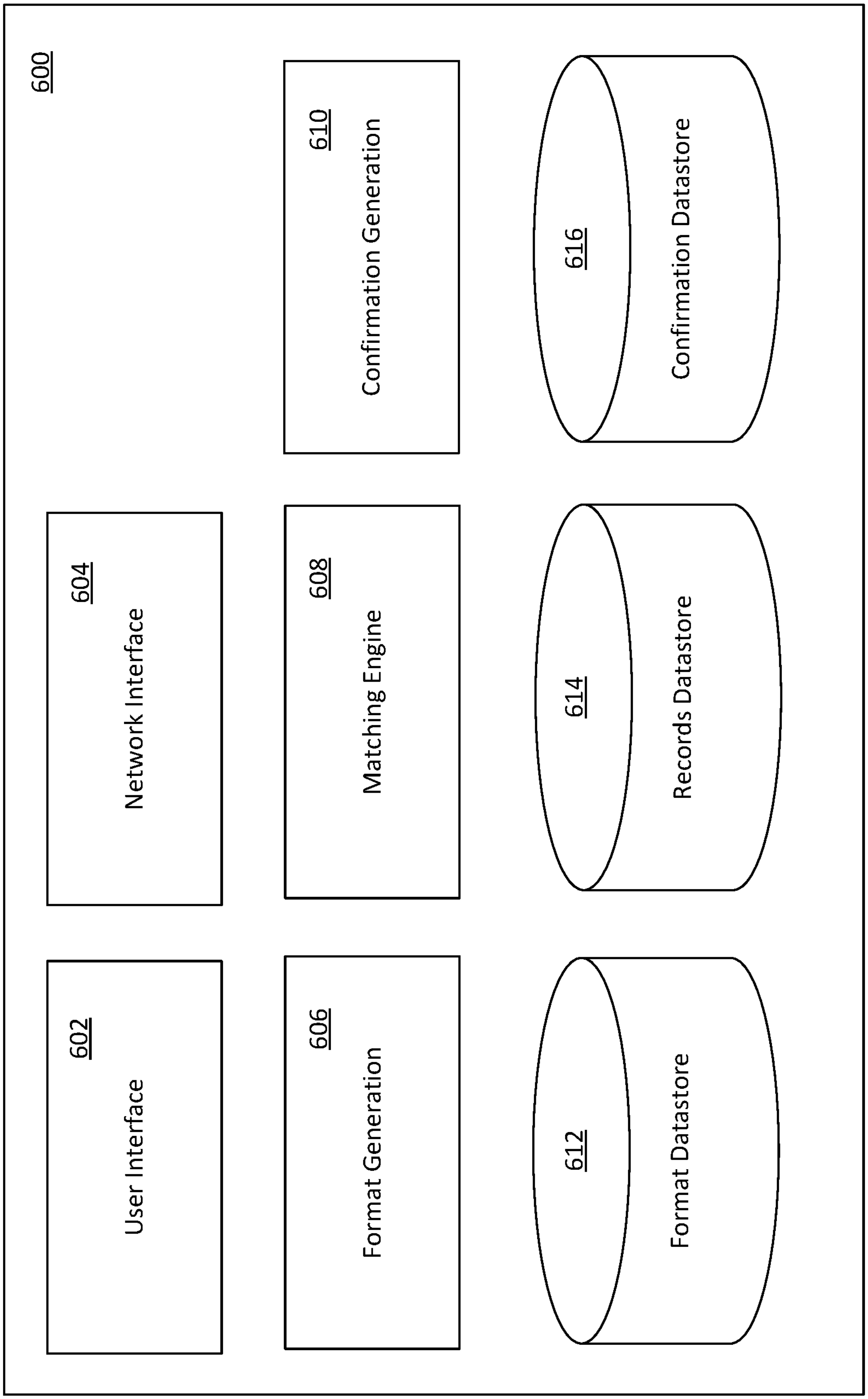
FIG. 6 is a block diagram of components that may be used in an confirmation platform.

FIG. 6 is a block diagram of components that may be used in an confirmation platform 600, such as the confirmation platform 316 of FIG. 3. The components may be, for example, software programs, parts of a software program, or multiple software programs being executed by one or more computer systems.

The confirmation platform 600 can include a user interface component 602. The user interface component 602 may be configured to provide user interfaces to one or more different users (for example, trader). The user interface component 602 may, for example, include a web server and the ability to generate and provide dynamic and/or status Hypertext Markup Language (HTML) pages to a client, for example, a web browser. The user interface component 602 may have the ability to manage communication with multiple different users through multiple different user interfaces during the same time period. For example, using conventional parallel processing techniques, such as multiple processing cores, multiple threads, etc.

The confirmation platform 600 may include a network interface 604. The network interface 604 may be configured to receive messages from users and to send messages to users using network protocols. These messages may be sent using the Hypertext Transport Protocol (HTTP) protocol, or may be send using some other network protocol, for example, a secure messaging queue such as MQ SERIES. The network interface may be configured to secure communications between the users and the confirmation platform using, for example, encryption protocols (such as the HTTPS protocol).

A format generation component 606 may be able to generate, assist in the creation, and store, a new messaging format for a user or group of users. In some implementations, the format generation component communicates with the user interface 602 and/or the network interface 604. In some implementations, a new messaging format may be stored in a format datastore 612. The format datastore 612 may be, for example, a relational or object database. The format data store 612 may also be, for example, a flat file system.

Generally, each messaging format stored in the format datastore 612 may be identified using a unique identifier. In some implementations, the unique identifier may be determined by the creator of the message format, in other implementations, the unique identifier may be generated by the confirmation platform 600. In some implementations, the unique identifier can include multiple different fields. In other implementations, the unique identifier is a single field.

When trade records are received by the confirmation platform 600, the trade records may be stored in a records datastore 614. A matching engine 608 may periodically look for matching records within the datastore 614. In some implementations, the matching engine 608 may look for matching trade records in response to a new record being received. In other implementations, the matching engine 608 may look for matching trade records in response to some other stimuli, for example, after a period of time has passed since the last time the matching engine 60 checked for matching records, for example, every 10 minutes.

The matching engine 608 selects a record to be the basis of the match. The selected record may be, for example, a record that has just been received from the network interface 604 of the user interface component 602. The selected record may also be a record selected from the records database 614. The matching engine 608 identifies the record format for the selected record. The matching engine 608 obtains the identified record format from the format datastore 612. As described above, the record format identifies fields that need to match in order for two records to be matching (referring to as matching fields).

The matching engine 608 compares the selected record to records in the record datastore 614 for a potential match. In some implementations, the matching engine 608 may reduce the amount of processing power required to perform the match by matching the selected record to only records in the records datastore 614 that have the same record format as the selected record. Other optimizations may also be performed, for example, the records to compare to the selected record may be further reduced by requiring that one of the identified trading partners in the record matches the identified trading partners in the selected record.

The matching engine 608 compares each of matching fields in the selected record to the matching fields in at least some of the records in the datastore. When the matching engine finds a matching record in the records datastore 614, the matching engine identifies a match and a confirmation generation component 610 generates a confirmation. The confirmation may be stored in a confirmation datastore 616.

The confirmation may be sent to the trading partners, for example, using the network interface 604.

In some implementations, only unmatched records are stored in the records datastore 614. For example, if the matching engine 608 checks the record datastore for a matching record for each record that is sent to the confirmation platform 600 as the record arrives, then the matching engine 608 only stores the received record in the records datastore 614 if a match is not found. Once a record, stored in the records datastore 614, is matched to an incoming record, the stored record may be deleted from the records datastore.

Figure 7:
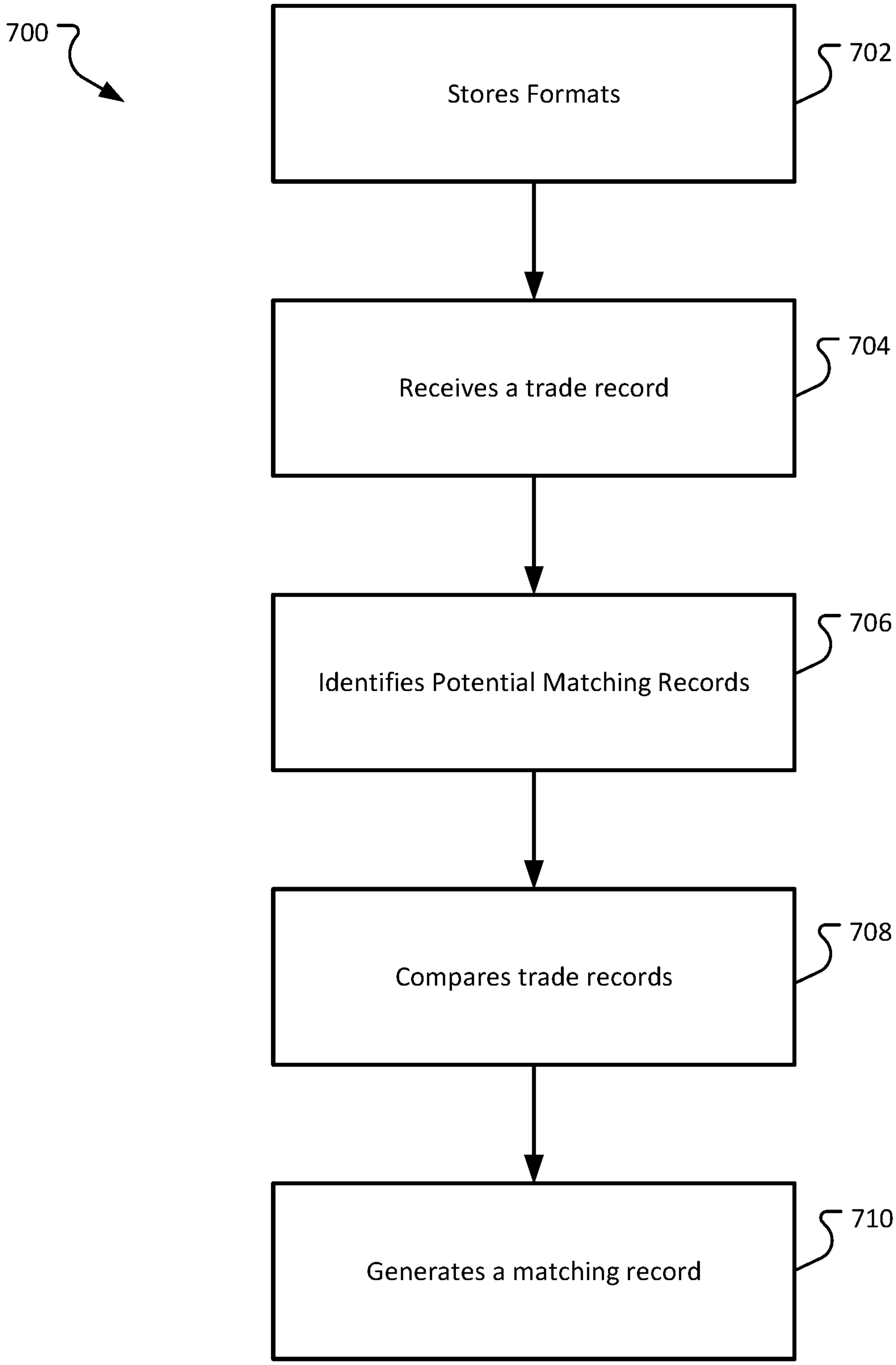
FIG. 7 illustrates an example process for processing records using customizable formats, Like reference symbols in the various drawings indicate like elements.

FIG. 7 illustrates an example process 700 for processing records using customizable formats. The process may be performed by a computer system, for example, by the confirmation platform 600 of FIG. 6.

The process 700 stores 702 record formats. The record formats may be record formats that are agreed to bilaterally between two trading partners.

The process 700 receives 704 a trade record. The trade record may contain information that enables the process to identify the record format of the trade record.

The process 700 identifies 706 potential matching records.

The process 700 compares 708 the potentially matching records to the received trade record.

If the process 700 identifies a match, the process generates 710 a matching trade record.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:

a plurality of computerized datastores comprising:
  a format datastore,
  a records datastore; and
a computerized platform comprising:
  a network interface configured to be coupled to one or more computerized networks,
  one or more processors, and
  one or more non-transitory computer-readable media, the one or more non-transitory computer-readable media including computer instructions that, when executed by the one or more processors, causes the one or more processors to perform operations comprising:
    storing, in a relational or an object database of the format datastore, a plurality of different electronic message formats, wherein each of the electronic message formats comprises:
      an indication of a name of the electronic message format,
      a plurality of fields,
      a plurality of field names identifying the plurality of fields, and
      an indication a plurality of matching fields corresponding to the electronic message format;
    storing, in the records datastore, a first electronic trade record received from a first computer device using the network interface;
    storing, in the records datastore, a plurality of second electronic trade records received from one or more respective second computer devices using the network interface;
    determining that the first electronic trade record has a first electronic message format selected from among the plurality of different electronic message formats;
    performing, using a matching engine of the computerized platform, a sequential multi-step matching process, the sequential multi-step matching process comprising:
      a first step comprising determining, using the matching engine of the computerized platform, and based on the first electronic message format, a subset of the second electronic trade records that potentially match the first electronic trade record, wherein determining the subset of the second electronic trade records comprises:
        for each of the second electronic trade records, determining that the second electronic trade record has a respective second electronic message format selected from among the plurality of different electronic message formats, and
        identifying, as the subset of the second electronic trade records, each of the second electronic trade records having a respective second electronic message format having the same name as the name of first electronic message format;
      a second step comprising comparing, using the matching engine, the first electronic trade record to the subset of the second electronic trade records, and refraining from comparing the first electronic trade record to the second electronic trade records that are not included in the subset of the subset of the second electronic trade records to reduce an expenditure of processing power by the matching engine, relative to comparing the first electronic trade record to each of the second electronic trade records;
      a third step comprising determining, using the matching engine and based on the comparison, that one of the second electronic trade records of the subset of the second electronic trade records matches the first electronic trade record, wherein determining that one of the second electronic trade records of the subset of the second electronic trade records matches the first electronic trade record comprises:
        determining that the first electronic message format comprises an indication of a plurality of first matching fields,
        determining that each of the second electronic trade records of the subset of the second electronic trade records comprises the plurality of first matching fields, and
        comparing values of the plurality of first matching fields of the second electronic trade records to corresponding fields of the first electronic trade record; and
    responsive to determining that that one of the second electronic trade records of the subset of second electronic trade records matches the first electronic trade record:
      generating a trade confirmation record based on (i) the first electronic trade record and (ii) the second electronic trade record of the subset of second electronic trade records that matches the first electronic trade record, wherein the trade confirmation record indicates that the first electronic trade record matches one of the second electronic trade record of the subset of second electronic trade records,
      transmitting, using the network interface, the trade confirmation record to the first computer device and to the second computer device from which the matching second electronic trade record was received, and
      deleting the matching second electronic trade record from the records datastore.

2. The system of claim 1, the operations further comprising:

storing, in the records datastore, a third electronic trade record received from a third computer device using the network interface;
determining that the third electronic trade record has a third electronic message format selected from among the plurality of different electronic message formats;
performing, using the matching engine of the computerized platform, the sequential multi-step matching process, the sequential multi-step matching process comprising:
  a fourth step comprising determining, using the matching engine, and based on the third electronic message format, a second subset of the second electronic trade records that potentially match the third electronic trade record, wherein determining the second subset of the second electronic trade records comprises:

for each of the second electronic trade records, determining that the second electronic trade record has a respective second electronic message format selected from among the plurality of different electronic message formats, and identifying, as the subset of the second electronic trade records, each of the second electronic trade records having a respective second electronic trade record format having the same name as the name of third electronic message format;

a fifth step comprising comparing, using the matching engine, the third electronic trade record to the second subset of the second electronic trade records, and refraining from comparing the third electronic trade record to the second electronic trade records that are not included in the second subset of the subset of the second electronic trade records;

a sixth step comprising determining, using the matching engine and based on the comparison, that none of the second electronic trade records of the second subset of the second electronic trade records matches the third electronic trade record, wherein determining that none of the second electronic trade records of the subset of the second electronic trade records matches the third electronic trade record comprises:

determining that the third electronic message format comprises an indication of a plurality of second matching fields, determining that none of the second electronic trade records of the subset of the second electronic trade records comprises the plurality of second matching fields; and responsive to determining that that none of the second electronic trade records of the second subset of second electronic trade records matches the third electronic trade record, maintaining the third electronic trade record in the records datastore.

3. The system of claim 1, wherein the first electronic message format corresponds to transactions for a first commodity, and wherein a second electronic message format of the plurality of electronic message formats corresponds to transactions for a second commodity different from the first commodity.

4. The system of claim 1, wherein each of the electronic message formats comprises one or more validation rules associated with at least some of the plurality of fields of that electronic message format.

5. The system of claim 4, wherein the one or more validation rules comprises a first rule specifying that a value of a particular field of the plurality of fields be greater than a threshold number.

6. The system of claim 1, wherein determining that one of the second electronic trade records of the subset of the second electronic trade records matches the first electronic trade record comprises:

determining that a value of one of the plurality of fields of the first electronic trade record matches a value of a corresponding one of the plurality of matching fields of the second electronic trade record.

7. The system of claim 1, wherein the plurality of computerized datastores comprises a confirmation datastore, and wherein the trade confirmation record is stored in the confirmation datastore.

8. The system of claim 1, wherein the first electronic trade record and the plurality of second electronic trade records are received via at least one of a Hypertext Transport Protocol (HTTP) protocol, a MQ Series protocol, or an encrypted Hypertext Transport Protocol (HTTPS) protocol, and wherein the trade confirmation record is transmitted using at least one of the HTTP protocol, MQ Series Protocol, or HTTPS protocol.

9. A method comprising:

storing, in a relational or an object database of a format datastore, a plurality of different electronic message formats, wherein each of the electronic message formats comprises:

an indication of a name of the electronic message format, a plurality of fields, a plurality of field names identifying the plurality of fields, and an indication a plurality of matching fields corresponding to the electronic message format;

storing, in a records datastore, a first electronic trade record received from a first computer device using a network interface;

storing, in the records datastore, a plurality of second electronic trade records received from one or more respective second computer devices using the network interface;

determining that the first electronic trade record has a first electronic message format selected from among the plurality of different electronic message formats;

performing, using a matching engine of a computerized platform, a sequential multi-step matching process, the sequential multi-step matching process comprising:

a first step comprising determining, using the matching engine, and based on the first electronic message format, a subset of the second electronic trade records that potentially match the first electronic trade record, wherein determining the subset of the second electronic trade records comprises:

for each of the second electronic trade records, determining that the second electronic trade record has a respective second electronic message format selected from among the plurality of different electronic message formats, and identifying, as the subset of the second electronic trade records, each of the second electronic trade records having a respective second electronic message format having the same name as the name of first electronic message format;

a second step comprising comparing, using the matching engine, the first electronic trade record to the subset of the second electronic trade records, and refraining from comparing the first electronic trade record to the second electronic trade records that are not included in the subset of the subset of the second electronic trade records to reduce an expenditure of processing power by the matching engine, relative to comparing the first electronic trade record to each of the second electronic trade records;

a third step comprising determining, using the matching engine and based on the comparison, that one of the second electronic trade records of the subset of the second electronic trade records matches the first electronic trade record, wherein determining that one of the second electronic trade records of the subset of the second electronic trade records matches the first electronic trade record comprises:

determining that the first electronic message format comprises an indication of a plurality of first matching fields, determining that each of the second electronic trade records of the subset of the second electronic trade records comprises the plurality of first matching fields, and comparing values of the plurality of first matching fields of the second electronic trade records to corresponding fields of the first electronic trade record; and responsive to determining that that one of the second electronic trade records of the subset of second electronic trade records matches the first electronic trade record:

generating a trade confirmation record based on (i) the first electronic trade record and (ii) the second electronic trade record of the subset of second electronic trade records that matches the first electronic trade record, wherein the trade confirmation record indicates that the first electronic trade record matches one of the second electronic trade record of the subset of second electronic trade records, transmitting, using the network interface, the trade confirmation record to the first computer device and to the second computer device from which the matching second electronic trade record was received, and deleting the matching second electronic trade record from the records datastore.

10. The method of claim 9, further comprising:

storing, in the records datastore, a third electronic trade record received from a third computer device using the network interface;

determining that the third electronic trade record has a third electronic message format selected from among the plurality of different electronic message formats;

performing, using the matching engine of the computerized platform, the sequential multi-step matching process, the sequential multi-step matching process comprising:

a fourth step comprising determining, using the matching engine, and based on the third electronic message format, a second subset of the second electronic trade records that potentially match the third electronic trade record, wherein determining the second subset of the second electronic trade records comprises:

for each of the second electronic trade records, determining that the second electronic trade record has a respective second electronic message format selected from among the plurality of different electronic message formats, and identifying, as the subset of the second electronic trade records, each of the second electronic trade records having a respective second electronic trade record format having the same name as the name of third electronic message format;

a fifth step comprising comparing, using the matching engine, the third electronic trade record to the second subset of the second electronic trade records, and refraining from comparing the third electronic trade record to the second electronic trade records that are not included in the second subset of the subset of the second electronic trade records;

a sixth step comprising determining, using the matching engine and based on the comparison, that none of the second electronic trade records of the second subset of the second electronic trade records matches the third electronic trade record, wherein determining that none of the second electronic trade records of the subset of the second electronic trade records matches the third electronic trade record comprises:

determining that the third electronic message format comprises an indication of a plurality of second matching fields, determining that none of the second electronic trade records of the subset of the second electronic trade records comprises the plurality of second matching fields; and responsive to determining that that none of the second electronic trade records of the second subset of second electronic trade records matches the third electronic trade record, maintaining the third electronic trade record in the records datastore.

11. The method of claim 9, wherein the first electronic message format corresponds to transactions for a first commodity, and wherein a second electronic message format of the plurality of electronic message formats corresponds to transactions for a second commodity different from the first commodity.

12. The method of claim 9, wherein each of the electronic message formats comprises one or more validation rules associated with at least some of the plurality of fields of that electronic message format.

13. The method of claim 12, wherein the one or more validation rules comprises a first rule specifying that a value of a particular field of the plurality of fields be greater than a threshold number.

14. The method of claim 9, wherein determining that one of the second electronic trade records of the subset of the second electronic trade records matches the first electronic trade record comprises:

determining that a value of one of the plurality of fields of the first electronic trade record matches a value of a corresponding one of the plurality of matching fields of the second electronic trade record.

15. The method of claim 9, wherein a plurality of computerized datastores comprises a confirmation datastore, and wherein the trade confirmation record is stored in the confirmation datastore.

16. The method of claim 9, wherein the first electronic trade record and the plurality of second electronic trade records are received via at least one of a Hypertext Transport Protocol (HTTP) protocol, a MQ Series protocol, or an encrypted Hypertext Transport Protocol (HTTPS) protocol, and wherein the trade confirmation record is transmitted using at least one of the HTTP protocol, MQ Series Protocol, or HTTPS protocol.

17. One or more non-transitory computer storage media encoded with computer program instructions that when executed by one or more processors cause the one or more processors to perform operations comprising:

storing, in a relational or an object database of a format datastore, a plurality of different electronic message formats, wherein each of the electronic message formats comprises:

an indication of a name of the electronic message format, a plurality of fields, a plurality of field names identifying the plurality of fields, and an indication a plurality of matching fields corresponding to the electronic message format;

storing, in a records datastore, a first electronic trade record received from a first computer device using a network interface;

storing, in the records datastore, a plurality of second electronic trade records received from one or more respective second computer devices using the network interface;

determining that the first electronic trade record has a first electronic message format selected from among the plurality of different electronic message formats;

performing, using a matching engine of a computerized platform, a sequential multi-step matching process, the sequential multi-step matching process comprising:

a first step comprising determining, using the matching engine, and based on the first electronic message format, a subset of the second electronic trade records that potentially match the first electronic trade record, wherein determining the subset of the second electronic trade records comprises:

for each of the second electronic trade records, determining that the second electronic trade record has a respective second electronic message format selected from among the plurality of different electronic message formats, and identifying, as the subset of the second electronic trade records, each of the second electronic trade records having a respective second electronic message format having the same name as the name of first electronic message format;

a second step comprising comparing, using the matching engine, the first electronic trade record to the subset of the second electronic trade records, and refraining from comparing the first electronic trade record to the second electronic trade records that are not included in the subset of the subset of the second electronic trade records to reduce an expenditure of processing power by the matching engine, relative to comparing the first electronic trade record to each of the second electronic trade records;

a third step comprising determining, using the matching engine and based on the comparison, that one of the second electronic trade records of the subset of the second electronic trade records matches the first electronic trade record, wherein determining that one of the second electronic trade records of the subset of the second electronic trade records matches the first electronic trade record comprises:

determining that the first electronic message format comprises an indication of a plurality of first matching fields, determining that each of the second electronic trade records of the subset of the second electronic trade records comprises the plurality of first matching fields, and comparing values of the plurality of first matching fields of the second electronic trade records to corresponding fields of the first electronic trade record; and responsive to determining that that one of the second electronic trade records of the subset of second electronic trade records matches the first electronic trade record:

generating a trade confirmation record based on (i) the first electronic trade record and (ii) the second electronic trade record of the subset of second electronic trade records that matches the first electronic trade record, wherein the trade confirmation record indicates that the first electronic trade record matches one of the second electronic trade record of the subset of second electronic trade records, transmitting, using the network interface, the trade confirmation record to the first computer device and to the second computer device from which the matching second electronic trade record was received, and deleting the matching second electronic trade record from the records datastore.

* * * * *